United States Patent
Hedge (10) Patent No.: US 11,181,156 B2
(45) Date of Patent: Nov. 23, 2021

(54) DISPLACEMENT-ACTUATED POSITIVE-DRIVE CLUTCH

(71) Applicant: PARKER-HANNIFIN CORPORATION, Cleveland, OH (US)

(72) Inventor: Jonathan S. Hedge, Cleveland, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 9 days.

(21) Appl. No.: 16/628,542

(22) PCT Filed: Jul. 9, 2018

(86) PCT No.: PCT/US2018/041203
§ 371 (c)(1),
(2) Date: Jan. 3, 2020

(87) PCT Pub. No.: WO2019/010475
PCT Pub. Date: Jan. 10, 2019

(65) Prior Publication Data
US 2020/0217374 A1 Jul. 9, 2020

Related U.S. Application Data

(60) Provisional application No. 62/529,717, filed on Jul. 7, 2017.

(51) Int. Cl.
*F16D 43/202* (2006.01)
*F16D 11/14* (2006.01)
(Continued)

(52) U.S. Cl.
CPC .......... *F16D 43/2024* (2013.01); *F16D 11/14* (2013.01); *F16D 43/02* (2013.01); *F16D 2023/123* (2013.01)

(58) Field of Classification Search
CPC ...... F16D 43/2024; F16D 11/14; F16D 41/22; F16D 43/02; F16D 43/26;
(Continued)

(56) References Cited

U.S. PATENT DOCUMENTS 479,192 A * 7/1892 Leedle
1,647,879 A * 11/1927 Miller ..................... F16D 43/26
192/32

(Continued)

FOREIGN PATENT DOCUMENTS

DE 102011015190 A1 9/2012

OTHER PUBLICATIONS

EP Communication, Application No. 18746435.9, dated Feb. 14, 2020.
(Continued)

*Primary Examiner* — Mark A Manley
(74) *Attorney, Agent, or Firm* — MacMillan, Sobanski & Todd, LLC (57) ABSTRACT

A displacement-actuated positive-drive clutch (10; 20) includes an input member (11; 21) having a positive engagement structure (11*d*; 21*d*) provided thereon and an output member (13; 23). A clutch plate (16; 25) is connected for rotation with and for axial movement relative to the output member (13; 23). The clutch plate (16; 25) has a positive engagement structure (16*b*; 25*b*) provided thereon that positively engages the positive engagement structure (11*d*; 21*d*) provided on the input member (11; 21) to engage the displacement-actuated positive-drive clutch automatically in response to the occurrence of a predetermined amount of relative rotational movement between the input member (11; 21) and the output member (13; 23).

10 Claims, 8 Drawing Sheets

(51) Int. Cl.
*F16D 23/12* (2006.01)
*F16D 43/02* (2006.01)

(58) Field of Classification Search
CPC ......... F16D 2023/123; F16D 2011/004; F16D 41/36; F16D 1/116
See application file for complete search history.

(56) References Cited

U.S. PATENT DOCUMENTS

| | | |
|---|---|---|
| 1,750,115 A | 3/1930 | Mason |
| 2,846,039 A | 8/1958 | Requa et al. |
| 3,016,122 A | 1/1962 | Miller |
| 3,753,479 A | 8/1973 | Williams |
| 4,192,411 A * | 3/1980 | Fogelberg .......... B60K 17/3515 180/245 |
| 4,271,914 A | 6/1981 | Dressel |
| 4,327,821 A * | 5/1982 | Telford .................. F16D 11/14 192/35 |
| 4,755,333 A | 7/1988 | Gray |
| 5,297,450 A | 3/1994 | MacPherson |
| 5,802,915 A | 9/1998 | Organek et al. |
| 7,665,589 B2 * | 2/2010 | Blanchard .............. A01D 34/69 192/46 |
| 9,476,460 B2 | 10/2016 | Seidl |
| 2009/0277744 A1 | 11/2009 | Shinagawa et al. |
| 2010/0294608 A1 | 11/2010 | Städele et al. |
| 2014/0140745 A1 | 5/2014 | Choi et al. |
| 2015/0105210 A1 | 4/2015 | Wadhva et al. |
| 2015/0202919 A1 * | 7/2015 | Koshiyama ........... B60B 27/047 192/64 |
| 2016/0348731 A1 * | 12/2016 | Knuth ..................... F16D 23/12 |

OTHER PUBLICATIONS

PCT International Preliminary Report on Patentability, Application No. PCT/US2018/041203, dated Jun. 6, 2019.
PCT Written Opinion, Application No. PCT/US2018/041203, dated Oct. 5, 2018.

* cited by examiner

DISPLACEMENT-ACTUATED POSITIVE-DRIVE CLUTCH

BACKGROUND OF THE INVENTION

This invention relates in general to clutches for selectively connecting a rotatably driving member to a rotatably driven member for concurrent rotation. In particular, this invention to an improved structure for a positive-drive clutch that is automatically actuated by relative rotational movement between the driving member and the driven member so as to cause a positive engagement therebetween.

A clutch is a well-known structure that is commonly used for selectively connecting a rotatably driving member to a rotatably driven member for concurrent rotation. In some types of clutches, the rotatably driving member and the rotatably driven member are each provided with one or more positive engagement structures, such as interlocking teeth or projecting lugs. When the clutch is engaged, the respective interlocking teeth or projecting lugs rotationally engage one another such that the rotatably driving member positively rotatably drives the rotatably driven member. When the clutch is disengaged, the respective interlocking teeth or projecting lugs do not rotationally engage one another such that the rotatably driving member does not rotatably drive the rotatably driven member. These direct mechanical and blocking engagement clutches are often referred to as positive-drive or no-slip clutches to distinguish them from other types of clutches, such as those in which the driving member rotatably drives the driven member by means of frictional contact between non-positively rotationally engaging surfaces.

The engagement and disengagement of a clutch is typically initiated by either a basic force (such as, for example, the depression of a clutch pedal by a foot of an operator) or by an intelligent control (such as, for example, an electromechanical actuator) in response to one or more operating conditions. However, in some instances, it is desirable to engage a clutch automatically in response to the occurrence of a predetermined amount of relative rotational displacement between the rotatably driving member and the rotatably driven member. Such a structure would allow the rotatably driven member to automatically engage the clutch after an effective delay from the initiation of rotation of the rotatably driving member.

SUMMARY OF THE INVENTION

This invention relates to an improved structure for a clutch that is automatically engaged in response to the occurrence of a predetermined amount of relative rotational displacement between the rotatably driving member and the rotatably driven member so as to cause a positive engagement therebetween. The displacement-actuated positive-drive clutch of this invention includes an input member having a positive engagement structure provided thereon and an output member. A clutch plate is connected for rotation with and for axial movement relative to the output member. The clutch plate has a positive engagement structure provided thereon that positively engages the positive engagement structure provided on the input member to engage the displacement-actuated positive-drive clutch automatically in response to the occurrence of a predetermined amount of relative rotational movement between the input member and the output member.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
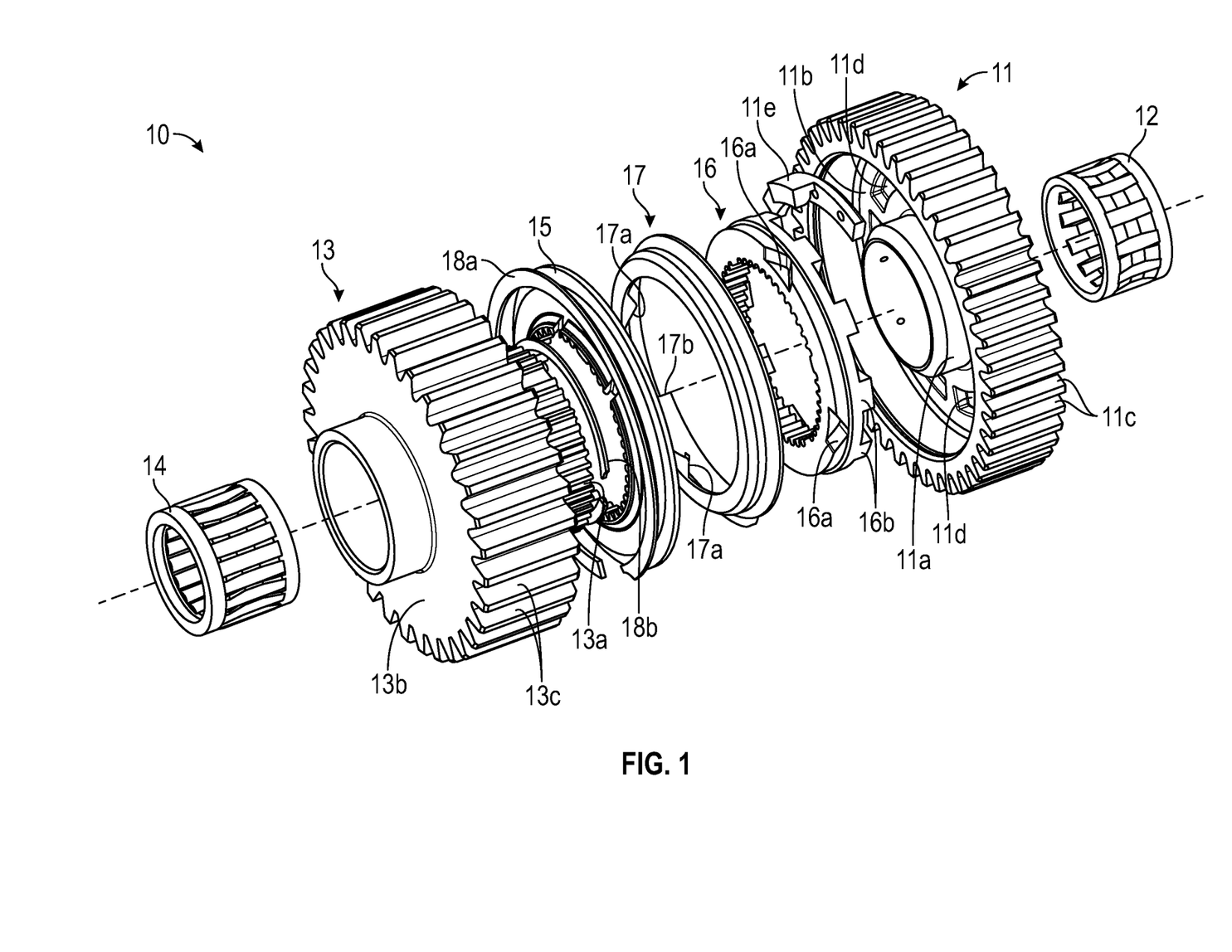
FIG. 1 an exploded perspective view of a first embodiment of a displacement-actuated positive-drive clutch in accordance with this invention.
Figure 2:
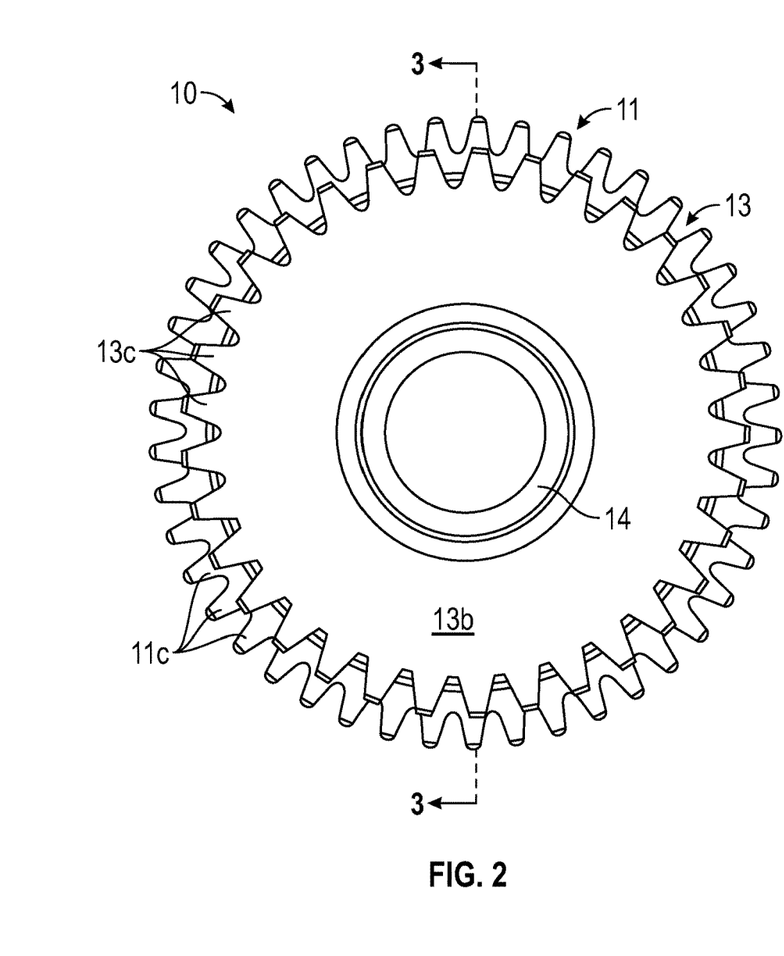
FIG. 2 is an end elevational view of the first embodiment of the displacement-actuated positive-drive clutch illustrated in FIG. 1.
Figure 3:
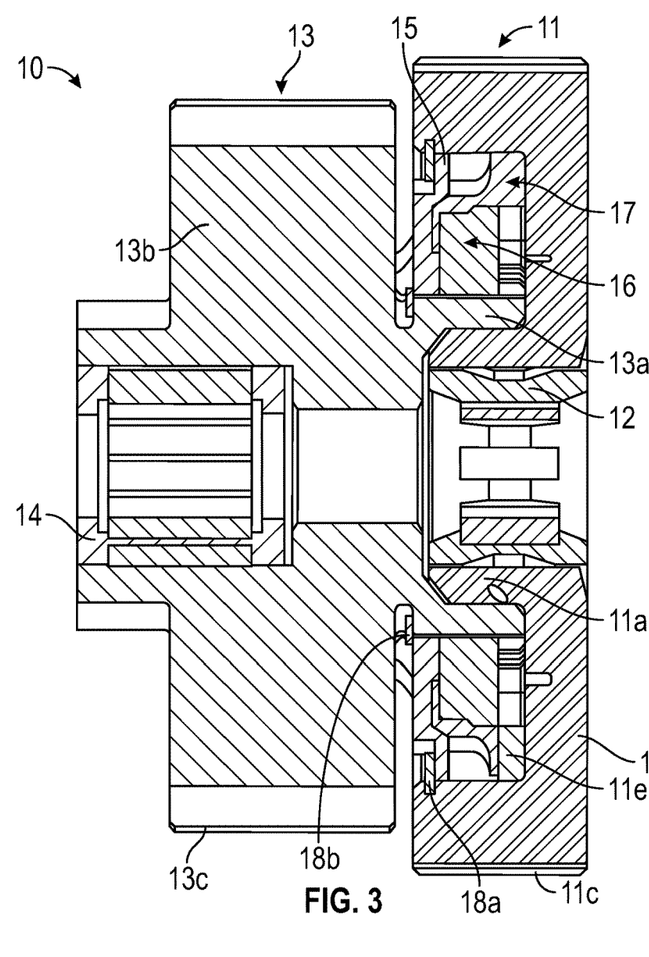
FIG. 3 is a sectional elevational view of the first embodiment of the displacement-actuated positive-drive clutch taken along line 3-3 of FIG. 2.

Referring now to the drawings, there is illustrated in FIGS. 1, 2, and 3 a first embodiment of a displacement-actuated positive-drive clutch, indicated generally at 10, in accordance with this invention. The first embodiment of the displacement-actuated positive-drive clutch 10 includes an input member, indicated generally at 11, that is adapted to be rotatably driven by a source of rotational energy (not shown) in a conventional manner. The illustrated input member 11 is a gear that includes an inner hollow sleeve portion 11a, a body portion 11b that extends generally radially outwardly from the inner hollow sleeve portion 11a, and a plurality of axially-extending teeth 11c provided on an outer periphery of the body portion 11b. However, the input member 11 may have any desired structure or geometry. The inner hollow sleeve portion 11a of the input member 11 may be rotatably supported on a conventional shaft or other support structure (not shown) by means of a conventional bearing 12.

The input member 11 has one or more positive engagement structures provided thereon. As best shown in FIG. 1, the illustrated positive engagement structures are embodied as a plurality of axially-facing clutch dog recesses 11d provided in an axially-facing surface of the body portion 11b of the input member 11. However, any desired number (including only one) of such clutch dog recesses 11d or other positive engagement structures may be provided at any desired location or locations on the input member 11. The purpose of such positive engagement structures will be explained below.

A stop arm 11e is supported on the input member 11 for rotation therewith. In the illustrated embodiment, the stop arm 11e is a generally L-shaped member having a first leg that is secured to the axially-facing surface of the body portion 11b of the input member 11 and a second leg that protrudes generally axially therefrom. However, the stop arm 11e may have any desired structure and may be formed integrally with the input member 11. The purpose of the stop arm 11e will also be explained below.

The first embodiment of the displacement-actuated positive-drive clutch 10 also includes an output member, indicated generally at 13, that may be connected to a rotatably driven device (not shown). The illustrated output member 13 is also a gear including an inner hollow sleeve portion 13a, a body portion 13b that extends generally radially outwardly from the inner hollow sleeve portion 13a, and a plurality of axially-extending teeth 13c provided on an outer periphery of the body portion 13b. However, the output member 13 may have any desired structure or geometry.

The inner hollow sleeve portion 13a of the output member 13 may be rotatably supported on a conventional shaft or other support structure (not shown) by means of a conventional bearing 14. The inner hollow sleeve portion 13a of the output member 13 may also be rotatably supported on an outer surface or other portion of the inner hollow sleeve portion 11a of the input member 11, as shown in FIG. 3. As best shown in FIG. 1, the inner hollow sleeve portion 13a of the illustrated output member 13 has an outer surface that is splined. The purpose of the splined outer surface of the inner hollow sleeve portion 13a of the output member 13 will be explained below.

An annular cover plate 15 is splined onto the splined outer surface of the inner hollow sleeve portion 13a of the output member 13. Thus, the cover plate 15 is connected to the output member 13 for concurrent rotation therewith and for axial movement relative thereto. The illustrated cover plate 15 is disposed adjacent to the body portion 13b of the output member 13, although such is not required.

A clutch plate, indicated generally at 16, is also splined onto the splined outer surface of the inner hollow sleeve portion 13a of the output member 13. Thus, the clutch plate 16 is also connected to the output member 13 for concurrent rotation therewith and for axial movement relative thereto. The illustrated clutch plate 16 is disposed adjacent to the body portion 11b of the input member 11, although such is not required. The clutch plate 16 includes one or more axially facing cam recesses 16a that are provided on a first axially facing side thereof (facing toward the cover plate 15 and the output gear 13) for a purpose that will be explained below. The clutch plate 16 also has one or more positive engagement structures provided thereon. As best shown in FIG. 1, the illustrated positive engagement structures are embodied as a plurality of clutch dogs 16b that are provided on a second axially facing side thereof (opposite to the first axially facing side and facing toward the input member 11). However, any desired number (including only one) of such clutch dogs 16b or other positive engagement structures may be provided at any desired location or locations on the clutch plate 16. The purpose of such positive engagement structures will be explained below.

A cam plate, indicated generally at 17, is supported for rotation relative to the clutch plate 16, the cover plate 15, and the output member 13. In the illustrated embodiment, the cam plate 17 is rotatably supported (i.e., not splined) on a portion of the clutch plate 16, although such is not required. Also, in the illustrated embodiment, the cam plate 17 is located between the cover plate 15 and the clutch plate 16, although again such is not required. The cam plate 17 includes one or more axially facing cams 17a that are provided on an axially facing side thereof (facing toward the clutch plate 16 and the input member 11) for a purpose that will be explained below. The cam plate 17 also includes a stop arm recess or abutment surface 17b that is provided on the same axially facing side thereof for a purpose that will also be explained below.

As best shown in FIGS. 1 and 3, the first embodiment of the displacement-actuated positive-drive clutch 10 may be assembled by initially securing the stop arm 11e to the axially-facing surface of the body portion 11b of the input member 11 for rotation therewith. As mentioned above, the second leg of the stop arm 11e thus protrudes generally axially from the body portion 11b of the input member 11 toward the output member 13. Then, the clutch plate 16, the cam plate 17, and the cover plate 15 are assembled onto the input member 11. If desired, a first retaining ring 18a may be provided to retain the clutch plate 16, the cam plate 17, and the cover plate 15 on the input member 11, as best shown in FIG. 3. Lastly, the output member 13 is assembled onto the input member 11 by inserting the inner hollow sleeve portion 13a of the output member 13 through the clutch plate 16 and the cover plate 15 such that the splined outer surface engages the clutch plate 16 and the cover plate 15 for concurrent rotation, as discussed above. If desired, a second retaining ring 18b may be provided to position the clutch plate 16, the cam plate 17, the cover plate 15, and the input member 11 on the output member 13, as best shown in FIG. 3.

The operation of the first embodiment of the displacement-actuated positive-drive clutch 10 will now be described. Initially, the input member 11 and the output member 13 are not rotatably driven and are positioned such that the clutch dogs 16b provided on the second side of the clutch plate 16 do not extend into the clutch dog recesses 11d provided on the input member 11. As a result, the first embodiment of the displacement-actuated positive-drive clutch 10 is disengaged, and the input member 11 of the clutch 10 is not connected to positively rotatably drive the output member 13.

When the source of rotational energy is subsequently actuated, the input member 11 initially rotates relative to the output member 13 because of the inertial load of the rotatably driven device that is connected to the output member 13. The stop arm 11e provided on the input member 11 engages the end of the stop arm recess 17b provided on the cam plate 17. This engagement causes the cam plate 17 to rotate with the input member 11. Thus, both the input member 11 and the cam plate 17 initially rotate relative to the cover plate 15, the clutch plate 16, and the output member 13. Such relative rotation between the cam plate 17 (which is connected to the input member 11) and the clutch plate 16 (which is connected to the output member 13) causes the cams 17a provided on the cam plate 17 to rotationally engage the cam recesses 16a provided on the first side of the clutch plate 16. This engagement causes the clutch plate 16 to move axially away from the output member 13 and toward the input member 11.

As a result of such axial movement, the clutch dogs 16b provided on the second side of the clutch plate 16 move axially into the clutch dog recesses 11d provided on the input member 11. Thus, the clutch plate 16 (as well as the cover plate 15 and the output member 13 connected thereto) is connected to rotate with the input member 11. Consequently, the first embodiment of the displacement-actuated positive-drive clutch 10 is engaged such that the input member 11 positively rotatably drives the output member 13.

Referring now to FIGS. 4 through 9 of the drawings, there is illustrated a second embodiment of a displacement-actuated positive-drive clutch, indicated generally at 20, in accordance with this invention. The second embodiment of the displacement-actuated positive-drive clutch 20 includes an input member, indicated generally at 21, that is adapted to be rotatably driven by a source of rotational energy (not shown) in a conventional manner. The illustrated input member 21 is a gear that includes an inner hollow sleeve portion 21a, a body portion 21b that extends generally radially outwardly from the inner hollow sleeve portion 21a, and a plurality of axially-extending teeth (not shown) provided on an outer periphery 21c of the body portion 21b. However, the input member 21 may have any desired structure or geometry. The inner hollow sleeve portion 21a of the input member 21 may be rotatably supported on a conventional shaft or other support structure (not shown) by means of a conventional bearing (not shown).

Figure 4:
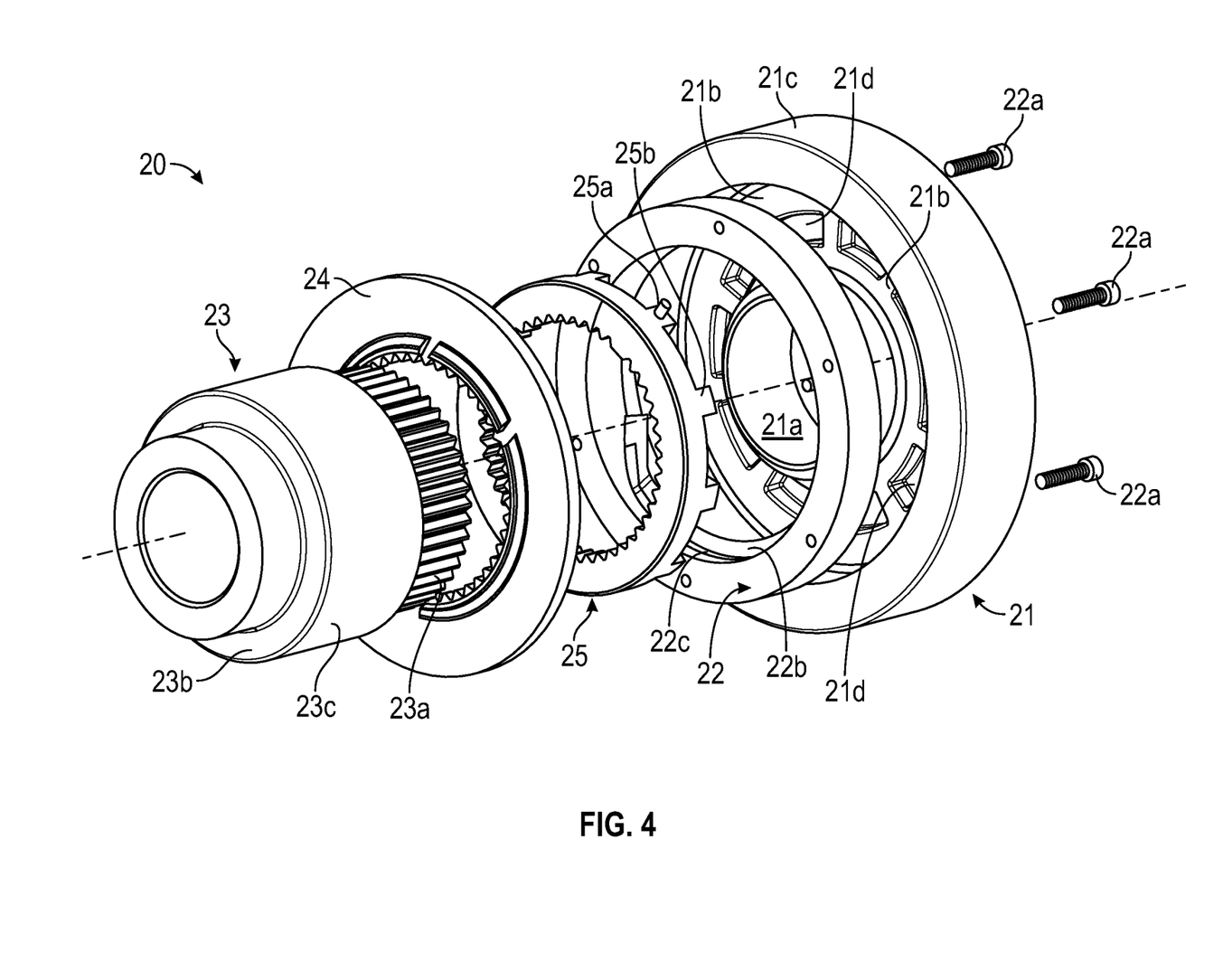
FIG. 4 is an exploded perspective view of a second embodiment of a displacement-actuated positive-drive clutch in accordance with this invention.

The input member 21 has one or more positive engagement structures provided thereon. As best shown in FIG. 4, the illustrated positive engagement structures are embodied as a plurality of axially-facing clutch dog recesses 21d provided in an axially-facing surface of the body portion 21b of the input member 21. However, any desired number (including only one) of such clutch dog recesses 21d or other positive engagement structures may be provided at any desired location or locations on the input member 21. The purpose of such positive engagement structures will be explained below.

A hollow cylindrical cam plate, indicated generally at 22, is secured to the input member 21 for concurrent rotation. In the illustrated embodiment, the cam plate 22 is secured to the input member 21 by a plurality of threaded fasteners 22a. However, the cam plate 22 may be secured for concurrent rotation with the input member 21 in any desired manner. The hollow cylindrical cam plate 22 has a radially inwardly-facing annular surface 22b provided thereon, and a radially outwardly-extending cam groove 22c extends throughout at least a portion of that radially annular surface 22b. In the illustrated embodiment, the cam groove 22c extends helically throughout an inner circumferential portion of the radially inwardly-facing annular surface 22b of the cam plate 22. However, the cam groove 22c may extend in any desired manner throughout some or all of the radially inwardly-facing annular surface 22b of the cam plate 22. The purpose of the cam groove 22c will be explained below.

The second embodiment of the displacement-actuated positive-drive clutch 20 also includes an output member, indicated generally at 23, that may be connected to a rotatably driven device (not shown). The illustrated output member 23 is an annular gear that includes an inner hollow sleeve portion 23a, a body portion 23b that extends generally radially outwardly from the inner hollow sleeve portion 23a, and a plurality of axially-extending teeth (not shown) provided on an outer periphery 23c of the body portion 23b. However, the output member 23 may have any desired structure or geometry. The inner hollow sleeve portion 23a of the output member 23 may be rotatably supported on a conventional shaft or other support structure (not shown) by means of a conventional bearing (not shown). The inner hollow sleeve portion 23a of the output member 23 may also be rotatably supported on an outer surface of the inner hollow sleeve portion 21a of the input member 21, as shown in FIGS. 5 through 9. As best shown in FIG. 4, the inner hollow sleeve portion 23a of the illustrated output member 23 has an outer surface that is splined. The purpose of the splined outer surface of the inner hollow sleeve portion 23a of the output member 23 will be explained below.

A cover plate 24 is splined onto the splined outer surface of the inner hollow sleeve portion 23a of the output member 23. Thus, the cover plate 24 is connected to the output member 23 for concurrent rotation therewith and for axial movement relative thereto. The illustrated cover plate 24 is disposed adjacent to the body portion 23b of the output member 23, although such is not required.

A clutch plate, indicated generally at 25, is also splined onto the splined outer surface of the inner hollow sleeve portion 23a of the output member 23. Thus, the clutch plate 25 is also connected to the output member 23 for concurrent rotation therewith and for axial movement relative thereto. The illustrated clutch plate 25 is disposed within the cam plate 22 adjacent to the body portion 21b of the input member 21, although such is not required. The clutch plate 25 includes an outwardly extending cam follower 25a that is received within the internal cam groove 22b provided in the radially inwardly-facing annular surface 22b of the hollow cylindrical cam plate 22 for a purpose that will be explained below. The clutch plate 25 also has one or more positive engagement structures provided thereon. As best shown in FIG. 4, the illustrated positive engagement structures are embodied as a plurality of clutch dogs 25b that are provided on an axially facing side thereof (facing toward the input member 21). However, any desired number (including only one) of such clutch dogs 25b or other positive engagement structures may be provided at any desired location or locations on the clutch plate 25. The purpose of such positive engagement structures will be explained below.

Figure 5:
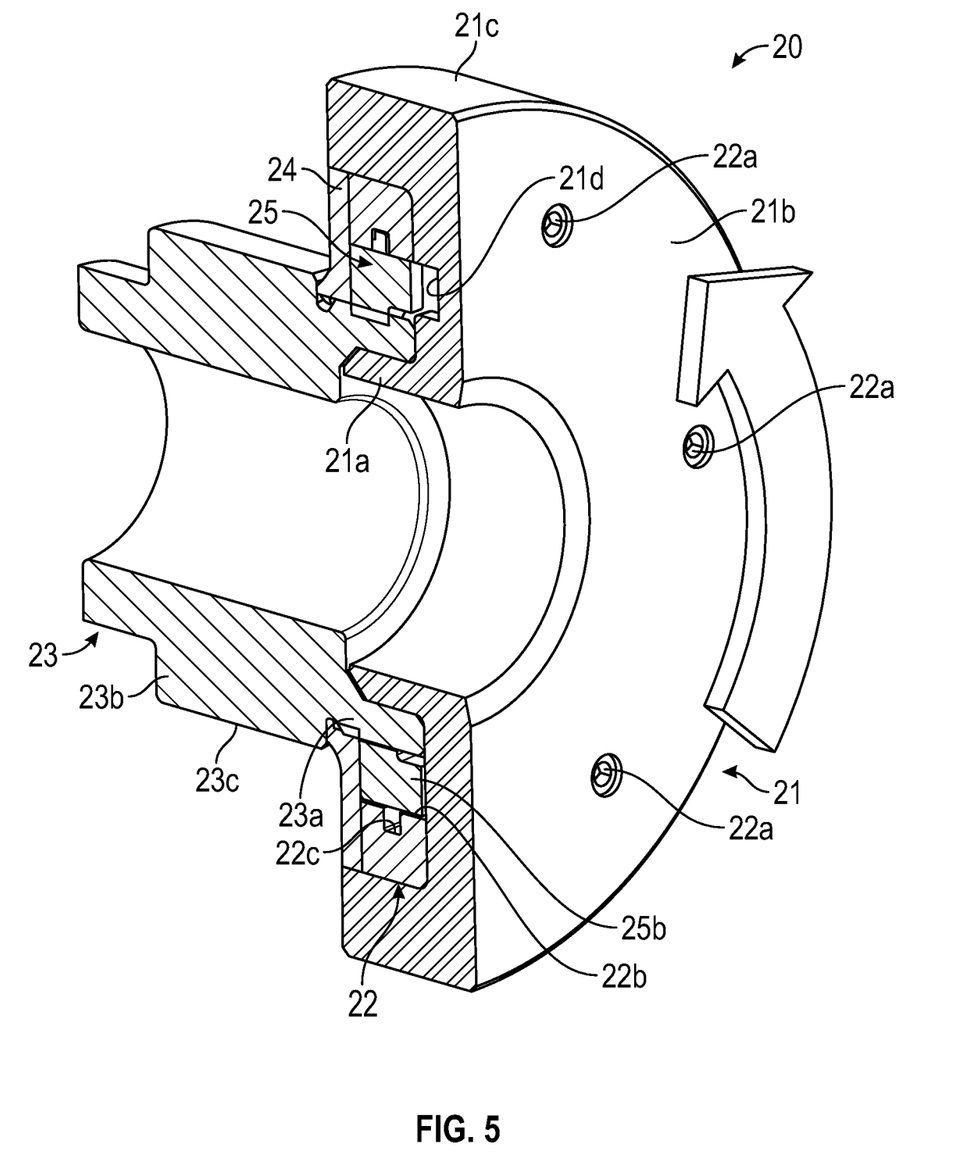
FIG. 5 is a perspective view, partially broken away, of the second embodiment of the displacement-actuated positive-drive clutch illustrated in FIG. 4, showing the clutch in a disengaged condition.

The operation of the second embodiment of the displacement-actuated positive-drive clutch 20 will now be described. Initially, the input member 21 and the output member 23 are not rotatably driven and are positioned such that the clutch dogs 25b provided on the clutch plate 25 do not extend into the clutch dog recesses 21d provided on the input member 21. As a result, the second embodiment of the displacement-actuated positive-drive clutch 20 is disengaged, and the input member 21 of the clutch 20 is not connected to positively rotatably drive the output member 23.

Figure 6:
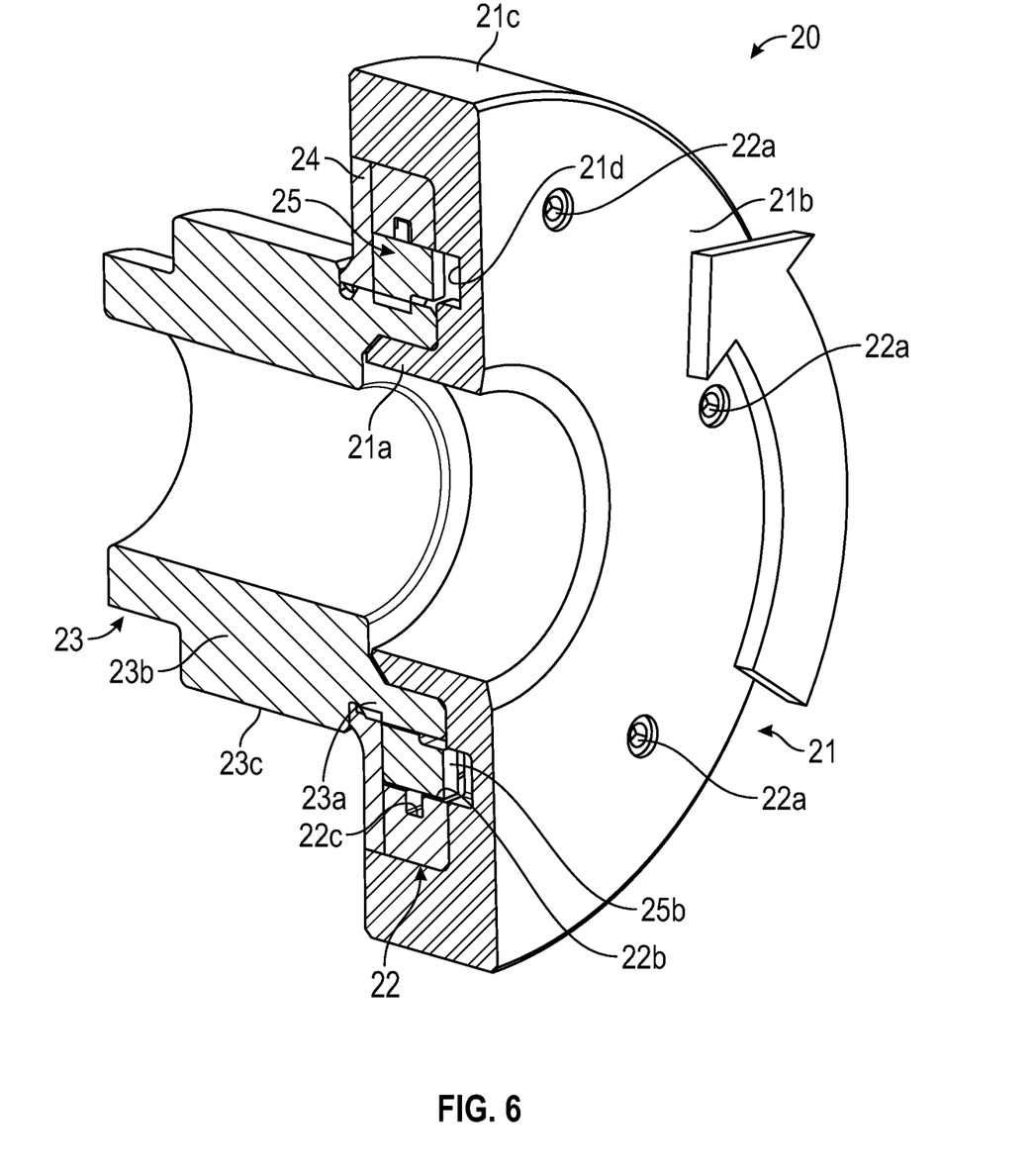
FIG. 6 is a perspective view similar to FIG. 5, showing the displacement-actuated positive-drive clutch in an initial partially engaged condition.
Figure 7:
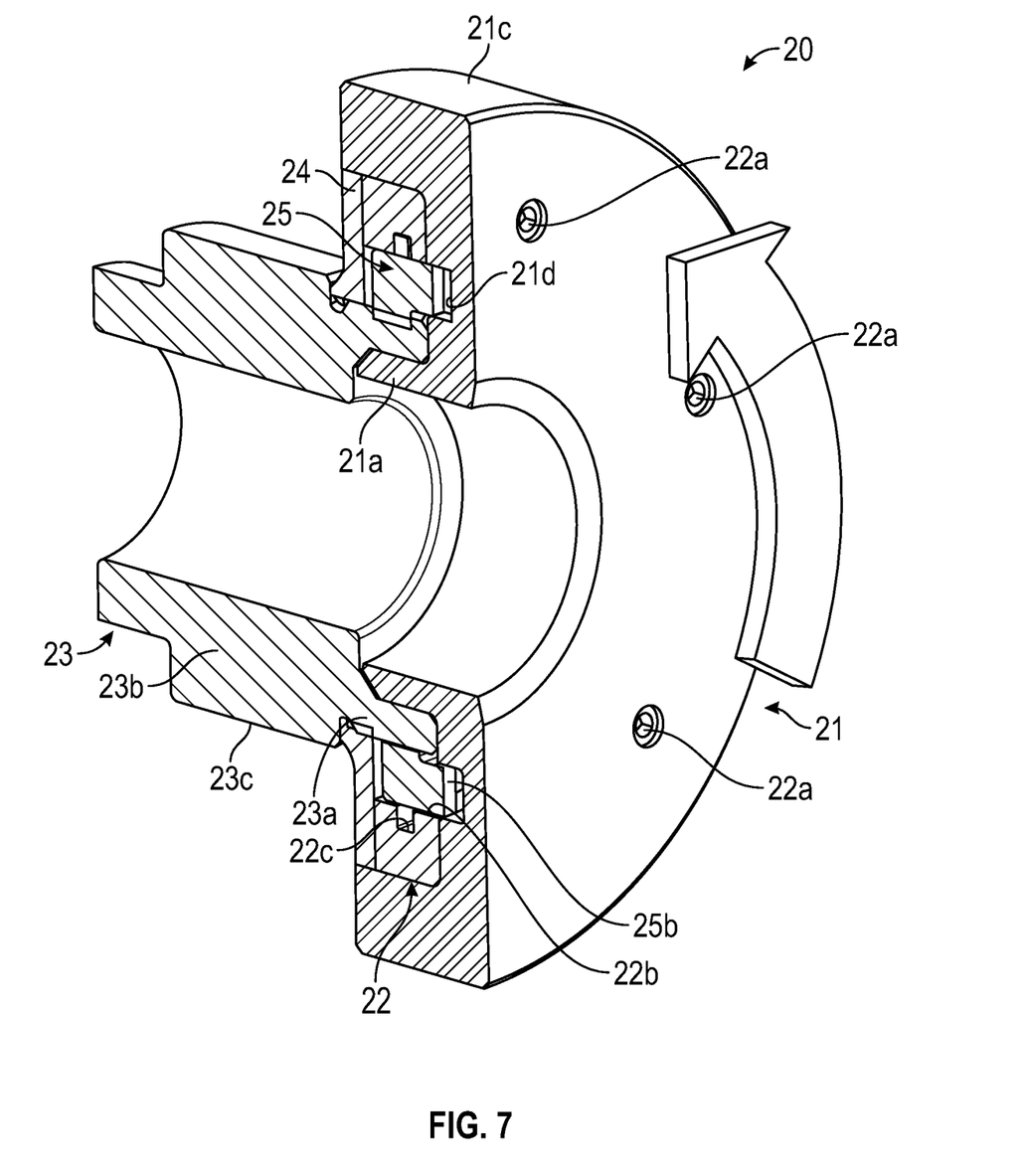
FIG. 7 is a perspective view similar to FIG. 6, showing the displacement-actuated positive-drive clutch in a further partially engaged condition.
Figure 8:
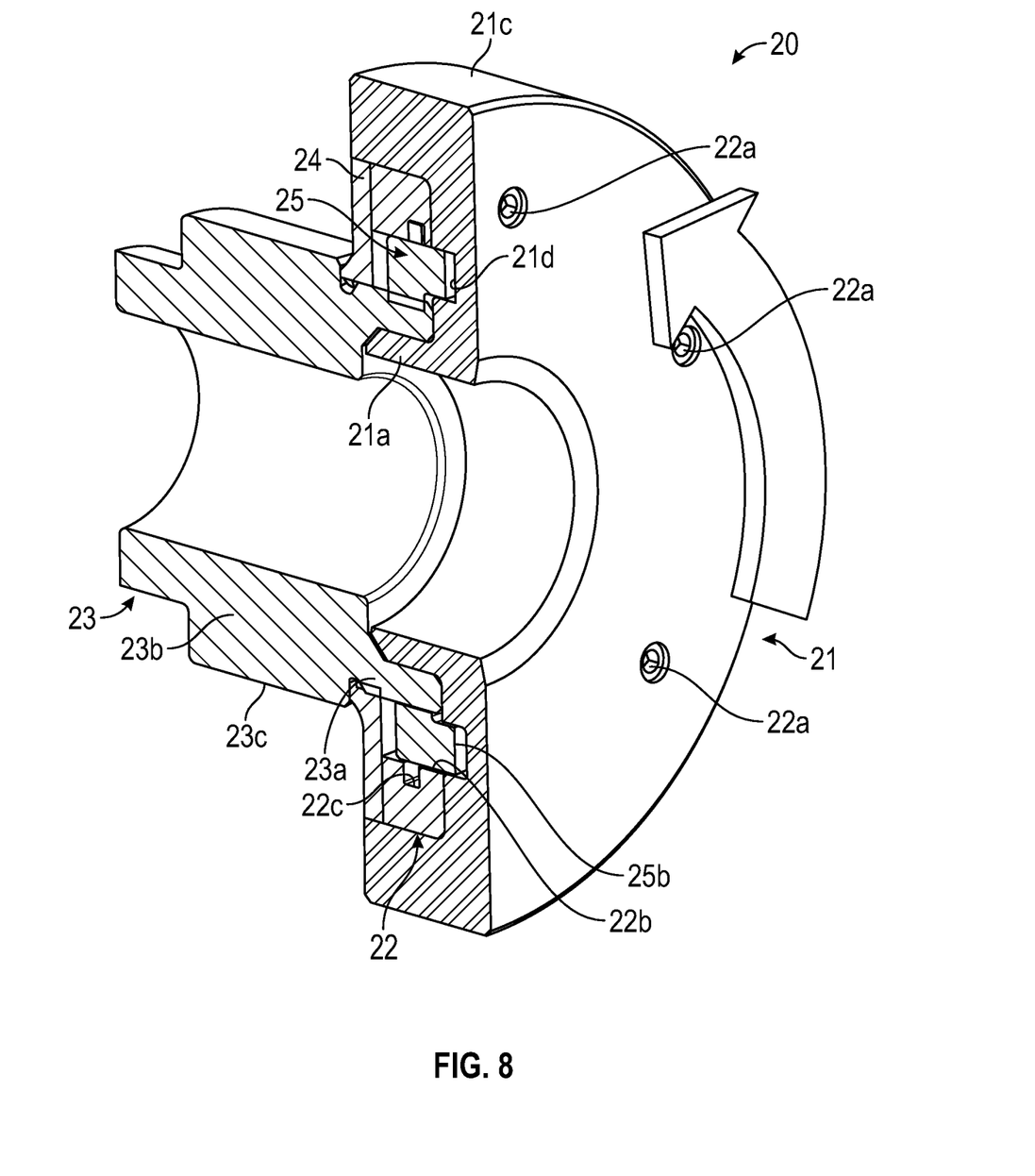
FIG. 8 is a perspective view similar to FIG. 7, showing the displacement-actuated positive-drive clutch in a still further partially engaged condition.

When the source of rotational energy is subsequently actuated, the input member 21 and the hollow cylindrical cam plate 22 both initially rotate relative to the output member 23 because of the inertial load of the rotatably driven device that is connected to the output member 23. Because the cam follower 25a provided on the clutch plate 25 is received within the internal cam groove 22b provided in the hollow cylindrical cam plate 22, this relative rotational movement causes the clutch plate 25 to rotate relative to the hollow cylindrical cam plate 22 and the input member 21. Also, because of the helical shape of the cam groove 22c, such relative rotation causes the clutch plate 25 to move axially away from the output member 23 and toward the input member 21.

Figure 9:
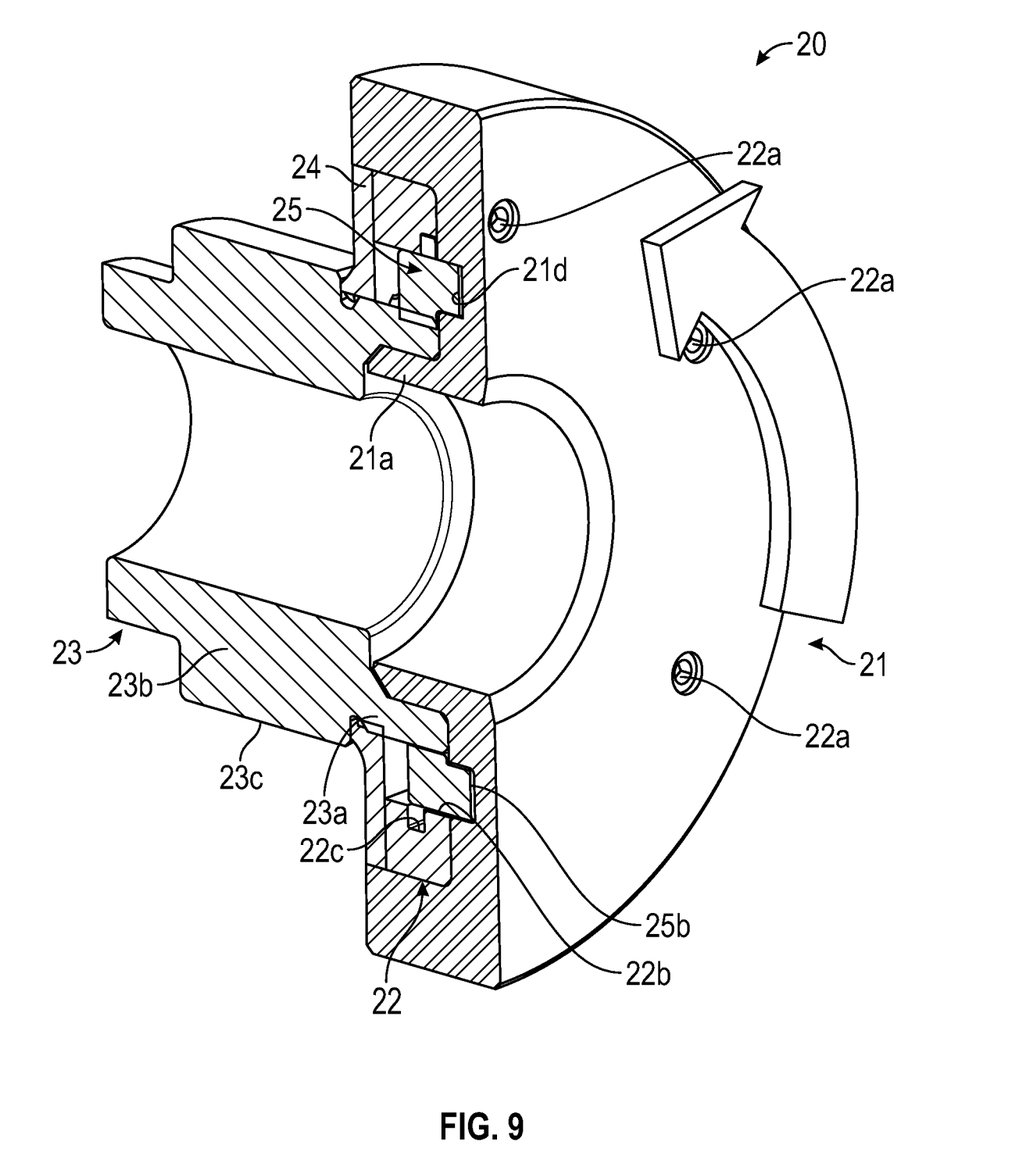
FIG. 9 is a perspective view similar to FIG. 8, showing the displacement-actuated positive-drive clutch in a fully engaged condition.

As a result, the clutch dogs 25b provided on the second side of the clutch plate 25 move axially into the clutch dog recesses 21d provided on the input member 21. Thus, the clutch plate 25 (as well as the cover plate 24 and the output member 23 connected thereto) is connected to rotate with the input member 21. Consequently, the second embodiment of the displacement-actuated positive-drive clutch 20 is engaged such that the input member 21 positively rotatably drives the output member 23.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A displacement-actuated positive-drive clutch comprising: an input member having a positive engagement structure provided thereon;
   a separate cam plate secured for rotation with the input member;
   an output member; and
   a clutch plate connected for rotation with and for axial movement relative to the output member, the clutch plate having a positive engagement structure provided thereon that positively engages the positive engagement structure provided on the input member to engage the displacement-actuated positive-drive clutch automatically in response to the occurrence of a predetermined amount of relative rotational movement between the input member and the output member; wherein either:
   (1) the cam plate is axially aligned with the input member and the clutch plate, and the input member has a stop arm that cooperates with an abutment surface provided on the cam plate such that the cam plate is connected for rotation with and for axial movement relative to the input member; or
   (2) the cam plate is axially aligned with the input member and the clutch plate, and the clutch plate is disposed between the input member and the cam plate; or
   (3) the cam plate is axially aligned with the input member and the clutch plate, and the cam plate includes a cam that cooperates with a cam recess provided on the clutch plate so as to cause the clutch plate to move toward the input member automatically in response to the occurrence of a predetermined amount of relative rotational movement between the input member and the output member; or
   (4) the cam plate is co-axial with the clutch plate, the cam plate has a surface provided thereon, a cam groove extends throughout at least a portion of the surface, and the clutch plate includes a cam follower that is received within the cam groove so as to cause the clutch plate to move toward the input member automatically in response to the occurrence of a predetermined amount of relative rotational movement between the input member and the output member.

2. The displacement-actuated positive-drive clutch defined in claim 1 wherein the positive engagement structure provided on the input member is a recess, and wherein the positive engagement structure provided on the clutch plate is a clutch dog that is received within the recess when the displacement-actuated positive-drive clutch is engaged.

3. The displacement-actuated positive-drive clutch defined in claim 1 further including a cam plate that is connected for rotation with the input member.

4. The displacement-actuated positive-drive clutch defined in claim 3 wherein the input member has a stop arm that cooperates with an abutment surface provided on the cam plate such that the cam plate is connected for rotation with the input member.

5. The displacement-actuated positive-drive clutch defined in claim 3 wherein the clutch plate is disposed between the input member and the cam plate.

6. The displacement-actuated positive-drive clutch defined in claim 3 wherein the cam plate includes a cam that cooperates with a cam recess provided on the clutch plate so as to cause the clutch plate to move toward the input member automatically in response to the occurrence of a predetermined amount of relative rotational movement between the input member and the output member.

7. The displacement-actuated positive-drive clutch defined in claim 1 further including a cam plate that is connected for rotation with the input member.

8. The displacement-actuated positive-drive clutch defined in claim 7 wherein the clutch plate is disposed between the output member and the cam plate.

9. The displacement-actuated positive-drive clutch defined in claim 7 wherein the cam plate has a surface provided thereon, and wherein a cam groove extends throughout at least a portion of the surface.

10. The displacement-actuated positive-drive clutch defined in claim 9 wherein the clutch plate includes a cam follower that is received within the cam groove provided in the surface so as to cause the clutch plate to move toward the input member automatically in response to the occurrence of a predetermined amount of relative rotational movement between the input member and the output member.

* * * * *